(12) United States Patent
Monsarrat

(10) Patent No.: US 12,361,655 B1
(45) Date of Patent: Jul. 15, 2025

(54) HANDLING INVALID USER CONTROL MOTIONS IN AUGMENTED REALITY

(71) Applicant: Monsarrat, Inc., Santa Monica, CA (US)

(72) Inventor: Jonathan Monsarrat, Santa Monica, CA (US)

(73) Assignee: Monsarrat, Inc., Swansea, MA (US)

( * ) Notice: Subject to any disclaimer, the term of this patent is extended or adjusted under 35 U.S.C. 154(b) by 0 days.

(21) Appl. No.: 19/096,144

(22) Filed: Mar. 31, 2025

Related U.S. Application Data

(63) Continuation-in-part of application No. 18/887,260, filed on Sep. 17, 2024, now Pat. No. 12,263,407.

(51) Int. Cl.
*G06T 19/00* (2011.01)
*G06F 3/01* (2006.01)
*G06T 7/70* (2017.01)

(52) U.S. Cl.
CPC ............ *G06T 19/006* (2013.01); *G06F 3/011* (2013.01); *G06T 7/70* (2017.01)

(58) Field of Classification Search
None
See application file for complete search history.

(56) References Cited

U.S. PATENT DOCUMENTS

2020/0061470 A1* 2/2020 Kidera .................... A63F 13/58

* cited by examiner

*Primary Examiner* — Nicholas R Wilson
(74) *Attorney, Agent, or Firm* — David J. Thibodeau, Jr.; VLP Law Group LLP

(57) ABSTRACT

Methods and systems for a virtual experience where a user holds or wears a computer device that displays a virtual world, and a simulation system reads user location information from a sensor in the computer device, and feeds that into a set of movement rules. Invalid user motions are handled smoothly, and valid user motions control a virtual avatar through the virtual world in a way that beyond simply an exact, one-to-one mapping of each user motion to each avatar motion. The system may also change the user's viewpoint in the virtual world, as shown on the computer device, or how the virtual world is correlated with the real world.

11 Claims, 14 Drawing Sheets

Simulation System to Calculate Superhuman Virtual Movement from Real World Movement

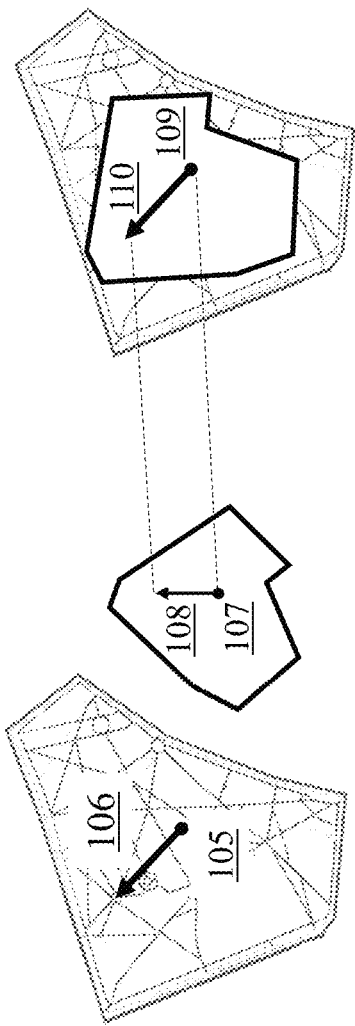
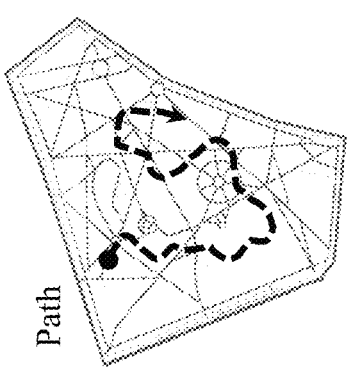
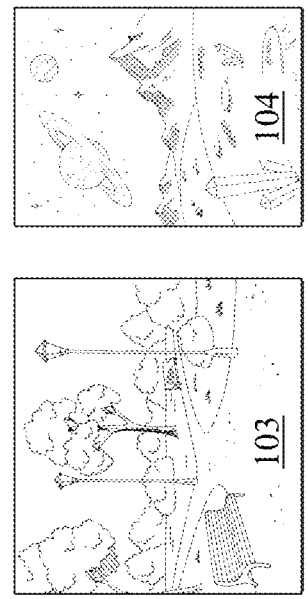
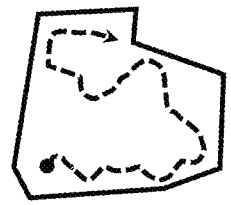
Fig. 1A A User with a Device
Fig. 1B A Real Space and a Virtual Space
Fig. 1C Are Correlated Along Some User View Vector
Fig. 1D The User Walks a Path in the Real Space
Fig. 1E That Navigates the Virtual Space

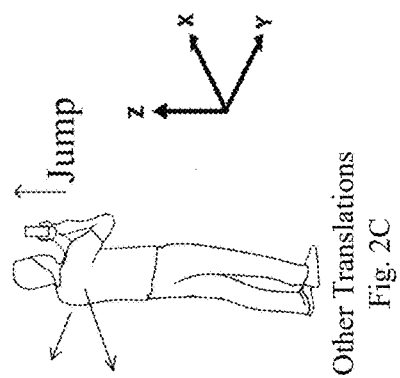
Other Translations
Fig. 2C
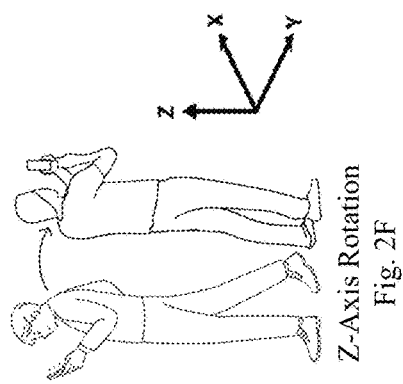
Z-Axis Rotation
Fig. 2F
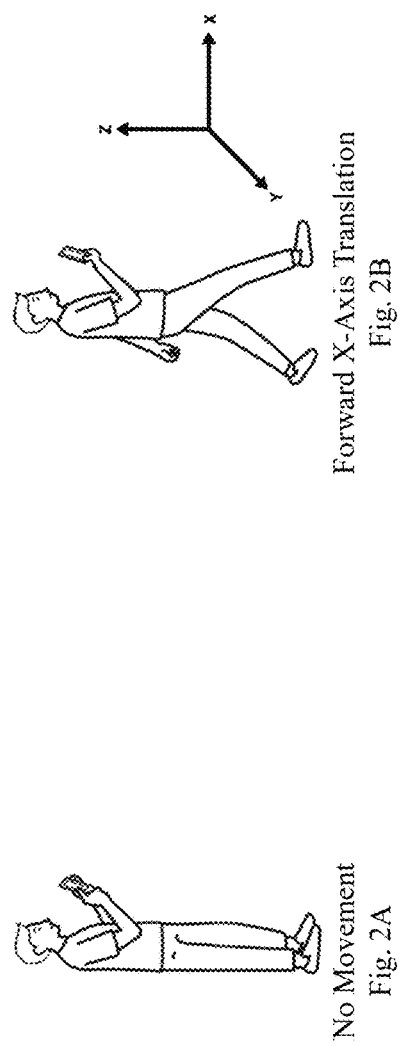
Forward X-Axis Translation
Fig. 2B
Y-Axis Rotation
Fig. 2E
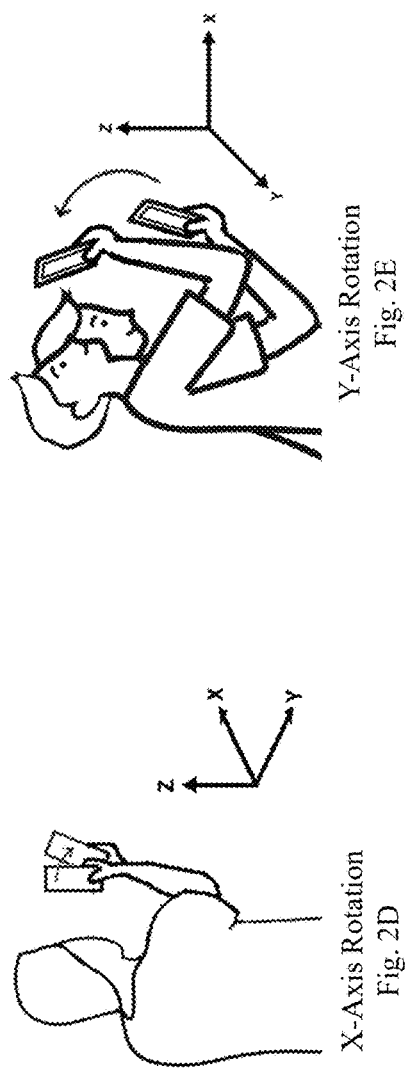
No Movement
Fig. 2A
X-Axis Rotation
Fig. 2D Car Avatar Acrobat Avatar Flying Avatar Skiing Avatar Airplane Avatar Super Speed Avatar Simulation System to Calculate Superhuman Virtual Movement from Real World Movement Example Movement of the User's Virtual Viewpoint Permitted Movements of the User's Virtual Viewpoint

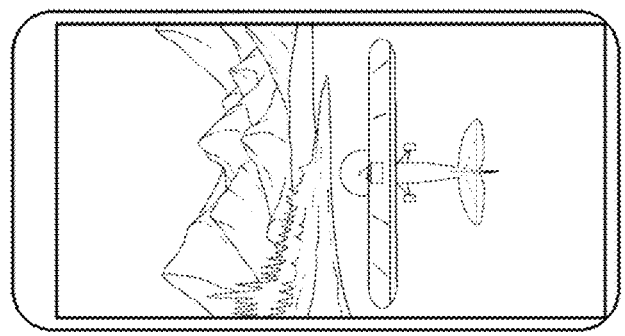
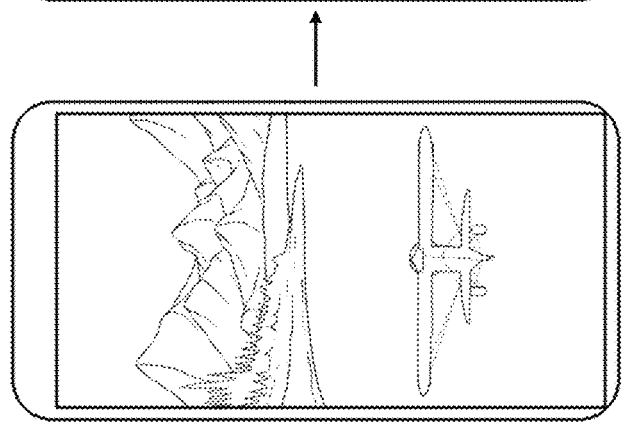
Y-Axis Avatar Rotation
Fig. 6B
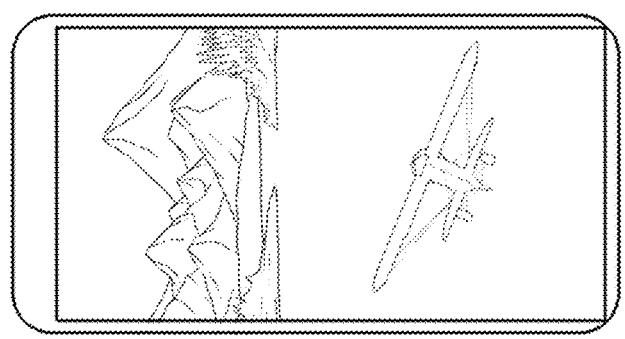
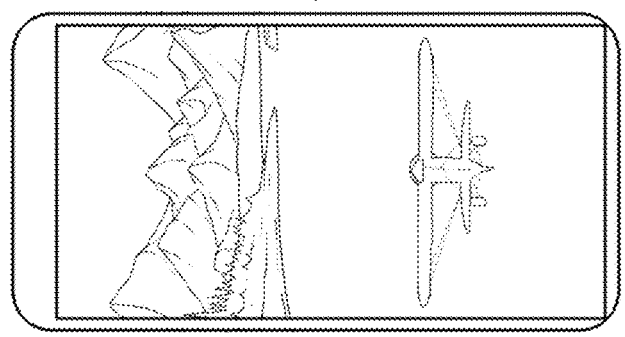
X-Axis Avatar Rotation
Fig. 6A

| Real World Motion | Virtual Avatar Motion | Notes |
|---|---|---|
| Positive X-Axis Translation | Accelerate or decelerate X-Axis translation to match a speed proportional to walking speed. | Ignore input speeds above some maximum. Input speeds below a minimum stalls the plane. |
| Negative X-Axis Translation | Brakes the plane's momentum. | Do not allow reverse plane movement. |
| Y-Axis and Z-Axis Translation | Banks the plane. | Awkward movements are not a preferred input. |
| X-Axis Rotation | Begin to bank the plane left or right, stopping when its tilt angle matches the user orientation. | Spin the plane avatar, not the ground plane, on the mobile device screen, to prevent the user feeling off-balance in the real world. |
| Y-Axis Rotation | Accelerate or decelerate banking the plane up or down. | Ignore input rotations beyond what's comfortable for the real world user's wearable or mobile device to tilt. |
| Z-Axis Rotation | Begin to bank the plane left or right and stop when its heading matches the user orientation. | |

Example Matrix of Movement Rules for an Airplane Avatar

Fig. 7

The User Outpaces the Forward Motion of the Avatar

Tile the Sample to Create a Virtual Landscape
Resembling the Real World Landscape Take a Visual Sample
of the Real World Camera View Responding to Prohibited User Motion By Adapting the Avatar Location and Orientation Responding to Prohibited User Motion With Moving the Virtual World

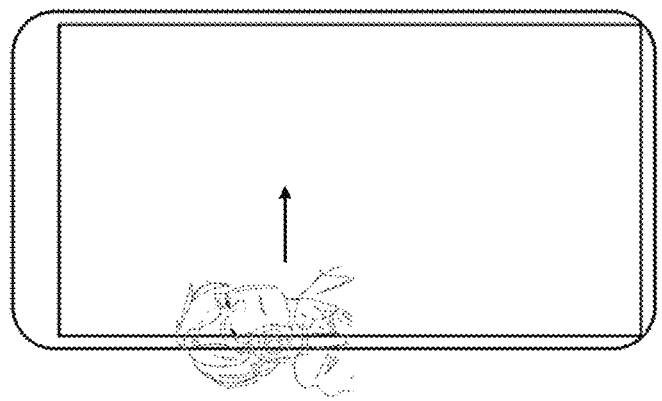
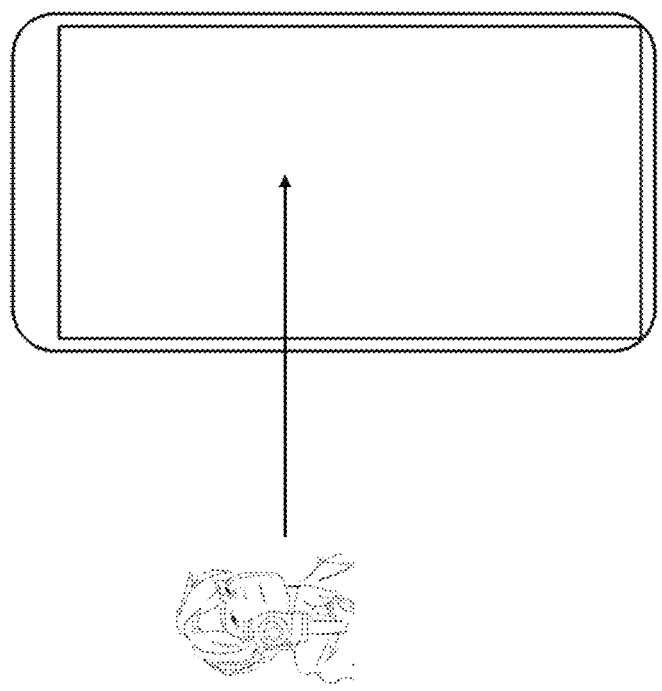
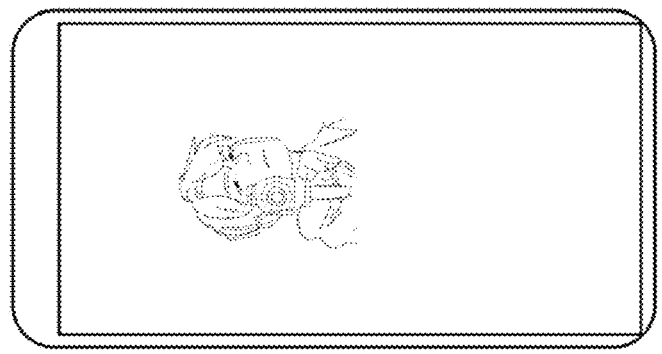
Responding to Other Types of Prohibited User Motion
Fig. 14

HANDLING INVALID USER CONTROL MOTIONS IN AUGMENTED REALITY

CROSS REFERENCE TO RELATED APPLICATIONS

This patent application is a continuation-in-part of a co-pending U.S. application Ser. No. 18/887,260 filed Sep. 17, 2024 entitled "Real World Walking to Control Superhuman Virtual World Movement", the entire content of which is hereby incorporated by reference.

TECHNICAL FIELD

This patent application relates to a Location-Based Experience (LBE) where a user makes movements in a simulated virtual world simply by walking through the real world.

BACKGROUND

Simulation systems that present a virtual world are key to video games, data visualization, and other fields, engaging a user's senses of sound and vision. But they traditionally ignore the user's sense of proprioception, the body's innate sense of its own movement. That's why virtual reality (VR) headsets are considered an improvement over tapping on a keyboard and making small mouse movements. You're still sitting in a chair, but physically moving your head in a VR headset to look around feels more immersive.

More recently, augmented reality simulation systems give an even greater immersive feeling, by allowing users to stand up and physically walk around to navigate a virtual world. Augmented Reality (AR) experiences increase immersion:
  a) by allowing a user to physically move around. The user feels the proprioceptive sense of his or her body moving, which is then matched to the view of the virtual world and the user's avatar within that world.
  b) by rendering the virtual world on top of a live video view of the real world, heightening the seeming reality of the virtual world.

As one example, see U.S. Pat. No. 11,112,250B1 entitled "System for automatic instantiation of a generically described location-based travelling experience to specific map coordinates and real-time conditions" assigned to Monsarrat, Inc., the assignee of the present application, the entire contents of which are hereby incorporated by reference. In that patent, a user's position and orientation in the real world is tracked by a device such as a mobile phone or Augmented Reality (AR) headset. A simulation system maintains a correlation vector that maps a virtual world space onto a real world space. The resulting Location Based Travel Experience (LBTE) is such that when the user walks one step forward in the real world, the mobile device senses this and the correlation vector is applied to move the user's avatar one step forward in the virtual world.

The user's movement are both a type of control input into the virtual world, and also a new type of "output", where your proprioceptive sense of physically moving, and the heightened body chemistry you get from a little exercise, becomes part of the immersive experience (suspension of disbelief) that you are navigating a virtual world. Haptic feedback may also form part of the output of the simulation system.

This works well when the real user's walking in the real world is perfectly matched to a user avatar walking in a virtual world. But it doesn't work when the user avatar needs to move in virtual ways that cannot match what the user is capable of in the real world. For example, no human in the real world is going to leap tall buildings as a control input to a virtual superhero. A real world user can also run, jump, dodge left and right, climb stairs, and make many other movements that the augmented reality system may wish to respond to.

And unusual virtual movements, for example flying an airplane upside down, such that the virtual world appears upside down, may work for a user seated in a chair with a static computer monitor, but won't work for a real world user trying to maintain his or her sense of balance while walking.

Such a system also needs to handle unusual physical movements by the user, which are deemed invalid for controlling the avatar, perhaps for safety or perhaps because the user avatar or overall simulation cannot handle some types of user motion as an input. Prior art (for example, the game Pokemon GO, can read a series of GPS locations over time to estimate speed, and then shut down the simulation if a user is moving too fast. The feature is intended to detect driving.

SUMMARY OF PREFERRED EMBODIMENTS

Systems that detect driving rely on GPS location data that is too coarse and inaccurate to read a range of user motions in real-time, especially now that augmented reality systems exist that can track user motion precisely, and shutting down a simulation completely is a heavy-handed and unintuitive way to warn a user. A new approach is needed that can detect unusual movements and respond more intuitively and help the user correct the invalid behavior.

A new type of simulation system is needed where simple real world movements such as walking are a control input into, and a type of "output" from, virtual world experiences.

More particularly, described herein is a simulation system that enables a user to navigate a virtual space in a controlled way, simply by holding or wearing a mobile device that tracks the user walking around. The system enables solves the problem where user movements which are necessarily limited to what is possible in the real world are associated with controlled movements of an avatar in a virtual world. As a result, movements of the avatar in the virtual world can now be quite different from movements that are possible for a normal human.

The avatar may represent a game character, a vehicle (such as a race car or airplane), game piece, or some other object in the virtual world having its movements controlled by, but not necessarily in lock step with, the user's movements in the real world.

The simulation system:
  1. Moves the user avatar through the virtual world, and
  2. Moves the user's viewpoint through the virtual world, which determines which part of the virtual world is shown on the user's mobile device.

A first goal is to make the real world control movements feel intuitive as an input to the simulation system. Like a child running with a toy car, the user should be able to simply walk straight ahead, walk while turning, or come to a stop, and optionally move the mobile device. Walking sideways or backwards will feel awkward and should not be required as control inputs.

A second goal is to make the virtual world movements feel intuitive to the type of user avatar. A person walking can stop on a dime, but a user avatar that is a virtual airplane can't do that. So if the user makes abrupt, mismatching real world movements, they need to be ignored or adapted.

The third goal is that the user should not be required to move the device, if held in the hand, in such a way that prevents the user from seeing the device's display, which needs to show the virtual world.

The final goal is to reduce the dissonance between the real world and virtual world. The key is to add limitations to movement of the user viewpoint and user avatar in the virtual world that reduce disorientation.

To satisfy these goals, the simulation system defines a series of real world user movement control inputs, and uses a set of movement rules to map them to two types of change in the virtual world: the user avatar and the user's viewpoint. The system maximizes the alignments of these two changes, to increase user immersion and decrease dissonance. The set of movement rules may also be used in reverse, if something happens in the virtual world which requires the user to perform a real world movement in response, or which triggers real world haptic feedback to the user.

In a specific implementation, a virtual experience method or system operates with a portable electronic device operated by a user. A definition for a virtual space is provided within which the user may navigate. Such movements within the virtual space cannot be determined by precisely replicating movements of the user within the physical space.

A relation or correlation is maintained between a virtual coordinate system associated with the virtual space and a physical coordinate system associated with a physical coordinate system or a "real world" space. The portable electronic device provides location data responsive to the estimates of physical location in the real world of the portable electronic device. The location data may include position, orientation, or acceleration information.

The method or system also maintains two correlate locations associated with the virtual space. These include (a) a user viewpoint, which defines how the virtual space is shown on the portable electronic device, and (b) user avatar, of a type associated with superhuman movements.

The location data is also processed against a set of movement rules to thereby determine changes to the user viewpoint and user avatar. The user viewpoint and user avatar are displayed on the portable electronic device.

More particularly, the system enables prohibiting or limiting some types of user motions in the real world, either for safety, or because they are disallowed in the virtual world, or because a correlated motion is disallowed for a user avatar. This can be done by:
Sensing the user motion (typically via the camera)
Using a set of motion rules to control the avatar. For example:
i. Perhaps the avatar is given instructions to follow the user's path, no matter where the user ends up;
ii. Perhaps the avatar is given instructions to arrive at the user's current position, even if this keeps changing as the user moves;
iii. Perhaps the avatar is given instructions to do something totally different-such as if the user shakes the smartphone and the system does not have a corresponding response, perhaps the avatar does nothing or a little dance;
iv. Perhaps the motion limits are not always imposed.
If the motion is prohibited or limited, then the location of the avatar may be separated from the location of the user.
As in other augmented reality systems, the user is allowed to "run ahead" of the avatar, with the view of the virtual world remaining locked to the user's correlate position in the virtual world, such that the avatar "falls behind" the user.
Optionally, some indication may be given as the status and/or position of the avatar and estimated time to catch up In some implementations, the avatar may make a best attempt to catch up with the user's correlate position in the virtual world, while respecting limits of the simulation. This may be for example (but not limited to):
Staying within a boundary of the virtual world, if it has a boundary;
Avoiding obstacles in the virtual world;
Or many other situations that could hinder or completely prevent the avatar from catching up (such as "running out of energy to move", "being attacked by some virtual world creature", encountering an impassable barrier, or If the user runs through the walls of a maze the avatar has to actually navigate the maze to catch up, etc.,
In some scenarios, if the avatar fails to catch up, or takes too long, the system may choose to indicate this state, or otherwise indicate that the user will need to meet up with the avatar to proceed further with the simulation.

The system might not lock the user's view of the virtual world to the user's correlate virtual world position. Instead, the system may:
Lock the view of the virtual world to the avatar
Or present the view of the virtual world as something else, such as a bird's eye top down view or a view taken from somewhere in-between a current position of the avatar and the user To accomplish this end, the system may move the placement of the virtual world in the real world such that a desired viewpoint in the virtual world appears on the user's computer device at the user's physical location. In other words, the viewpoint of the virtual world is reset.

In yet other scenarios, it may be desirable to not actually show a representation of an avatar (such as the user's "character" in the virtual world). Unlike other cases, the user knows where he or she "is" in the virtual world because the virtual world is always shown from a given viewpoint position and orientation (such a situation may be desirable in a first person type video game).

BRIEF DESCRIPTION OF THE DRAWINGS

FIGS. 1A to 1E show how a virtual world can be correlated with the real world.

FIGS. 2A to 2F show example real world movements to be used as control inputs.

FIGS. 6A to 6B show permitted movements of the user avatar in the virtual world.

FIG. 7 shows a set of movement rules relating control inputs to virtual movements.

FIG. 14 is an example with a different movement that is not forward motion.

DETAILED DESCRIPTION OF ILLUSTRATIVE EMBODIMENT(S)

Figure 3C:
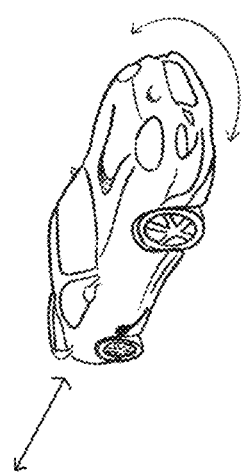
FIGS. 3A to 3F show example user avatars, and their desired virtual world movements.

A description of preferred embodiments follows.
How a Virtual World can be Correlated with the Real World The embodiments described herein assume the existence of a technology that provides virtual Location-Based Experiences (LBEs). One example of such a technology was described in the aforementioned U.S. Pat. No. 11,112,250B1. As explained in that patent, an LBE maps virtual user experience locations to real world locations using a graph of location elements, where nodes represent locations, and parent nodes define routes in-between locations and also define location properties to be inherited by child nodes. The location elements may further include map descriptors that refer to map metadata, including metadata; real-time descriptors, including at least whether locations are open or closed, or behavior of other users; experiential descriptors, including whether line-of-sight between locations should be kept or avoided, a mode of transportation users are expected to employ or whether the route needs to be entirely completed within a set time; and nesting and inheritance properties, such that larger LBEs may be assembled from contained smaller LBEs. A route can be laid out by the user physically moving from one location to next location in the real world map and selecting points on the real world map along the route; or by operating a flow based layout model where each node in sequence is automatically placed relative to an initial location, via a graph drawing algorithm that identifies possible location placements relative to element constraints based on a best-fit layout.

The present application is directed to a particular way in which a user avatar and representations of the virtual space are presented on the mobile device.

FIGS. 1A through 1E show how a user may make simple real world movements to navigate a virtual space.

As in FIG. 1A, a User 101 wears or holds a mobile device, personal computer, augmented reality headset, or some other data processor 102 that tracks his or her position and orientation in the real world.

As in FIG. 1B, the user participates in an LBE, or more generally, a "virtual experience", by walking through a Real-World Space 103 while wishing to navigate a Virtual Environment 104 which is visually rendered a computer screen that is part of the User's Device 102.

At given moments in time, as in FIG. 1C, the user will have a Real World Position 105 and a Real World Orientation 106, and possibly other location information such as acceleration. A user viewpoint will also have a Virtual World Position 107, which must be correlated 109 to the real world, and a Virtual World Orientation 108, and possibly other location information such as acceleration, which must also be correlated with the real world.

The most trivial case is described in the prior art patent referenced above: the user walks a Walking Path in the Real World, as in FIG. 1D, that is matched one-to-one with a Walking Path in the Virtual World, as in FIG. 1E.

This invention describes extensions to that prior art, which are referred to as Virtual World Correlation Vectors 109, 110 that let the user control superhuman motion through the virtual world, simply by walking 101 and moving the device 102 in the real world.
Permitted Real World User Control Movements FIGS. 2A to 2F show example real-world movements that form control inputs. The simulation system preferably chooses movements that seem intuitive and that best match the desired superhuman virtual movements:

In FIG. 2A, the user is not moving. This will be jarring if a user avatar is moving through the virtual world. Motion in the virtual world, even though superhuman, should be matched by some type of real world movement. Otherwise, we lose the proprioceptive sense that makes this form of virtual experience more immersive than others.

In FIG. 2B, the user walks straight ahead, which can be considered as a translation motion along an X-Axis. This is a simple, intuitive movement that gives the user a visceral sense of motion, because the user really is moving. Users may start and stop walking abruptly, which may not match desired virtual world motion.

FIG. 2C shows unintuitive motions such as moving sideways, walking backwards, and jumping, that can be considered to be translations along one or more of an X-axis, Y-axis, or Z-axis. Requiring the user to make uncomfortable movements would not be part of most implementations.

FIGS. 2D and 2E show moving an augmented reality headset or other mobile device 102. These motions can of course be combined with walking.

FIG. 2F shows turning, which can of course also be combined with walking. Users can turn abruptly, which may not match desired virtual world motion.

Example User Avatars and Intended Movements

Figure 3F:
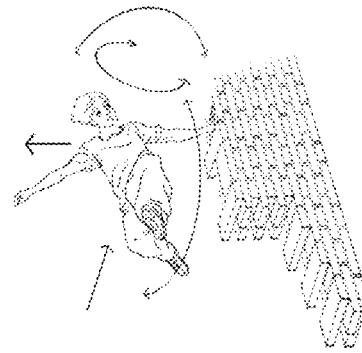
Figure 3B:
Figure 3E:
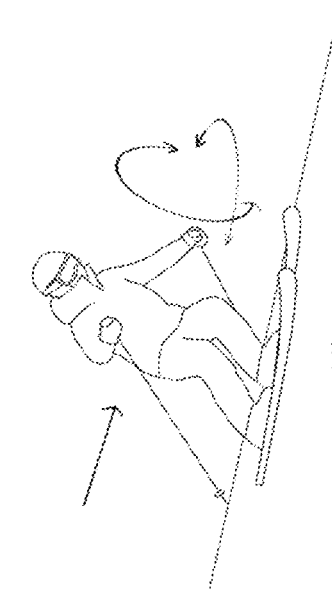
Figure 3A:
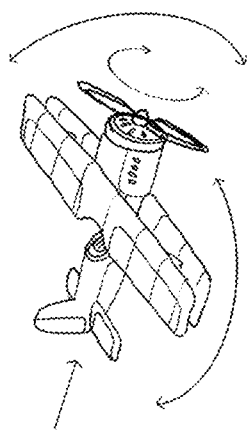

FIGS. 3A to 3F show example virtual avatars and their needed movements. The user's real world movements must be translated into virtual world movements while being constrained, e.g., to ensure that the movements obey the rules of the type of superhuman avatar being simulated:

For example, an airplane avatar, as in FIG. 3A, or flying superhero avatar, as in FIG. 3B, can be permitted to translate forward, but not along other axes, and it cannot start or stop abruptly. It can rotate along all axes, but not "turn on a dime".

A car avatar, as in FIG. 3C, can translate forwards or backwards, but not instantly, and not along other axes, and can only rotate left or right, but not abruptly. The car of course is normally fixed at ground level.

Figure 3D:
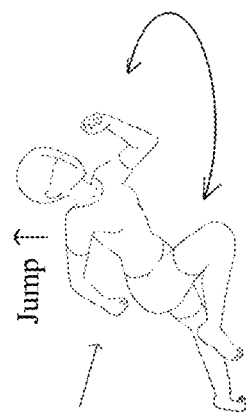

A super speed runner, as in FIG. 3D, can translate forwards, and may start or stop abruptly, and may rotate abruptly or even jump upwards.

A skier, as in FIG. 3E, is similar, but additionally may lean slightly, rotating left or rightwards.

An acrobat, as in FIG. 3F, can move in all directions, is normally fixed to the ground, but may at times leap from the ground while being temporarily fixed to objects, such as the shown hand on a brick wall in a parkour course.

System to Calculate Superhuman Virtual Movement from Real Movement

Figure 4:
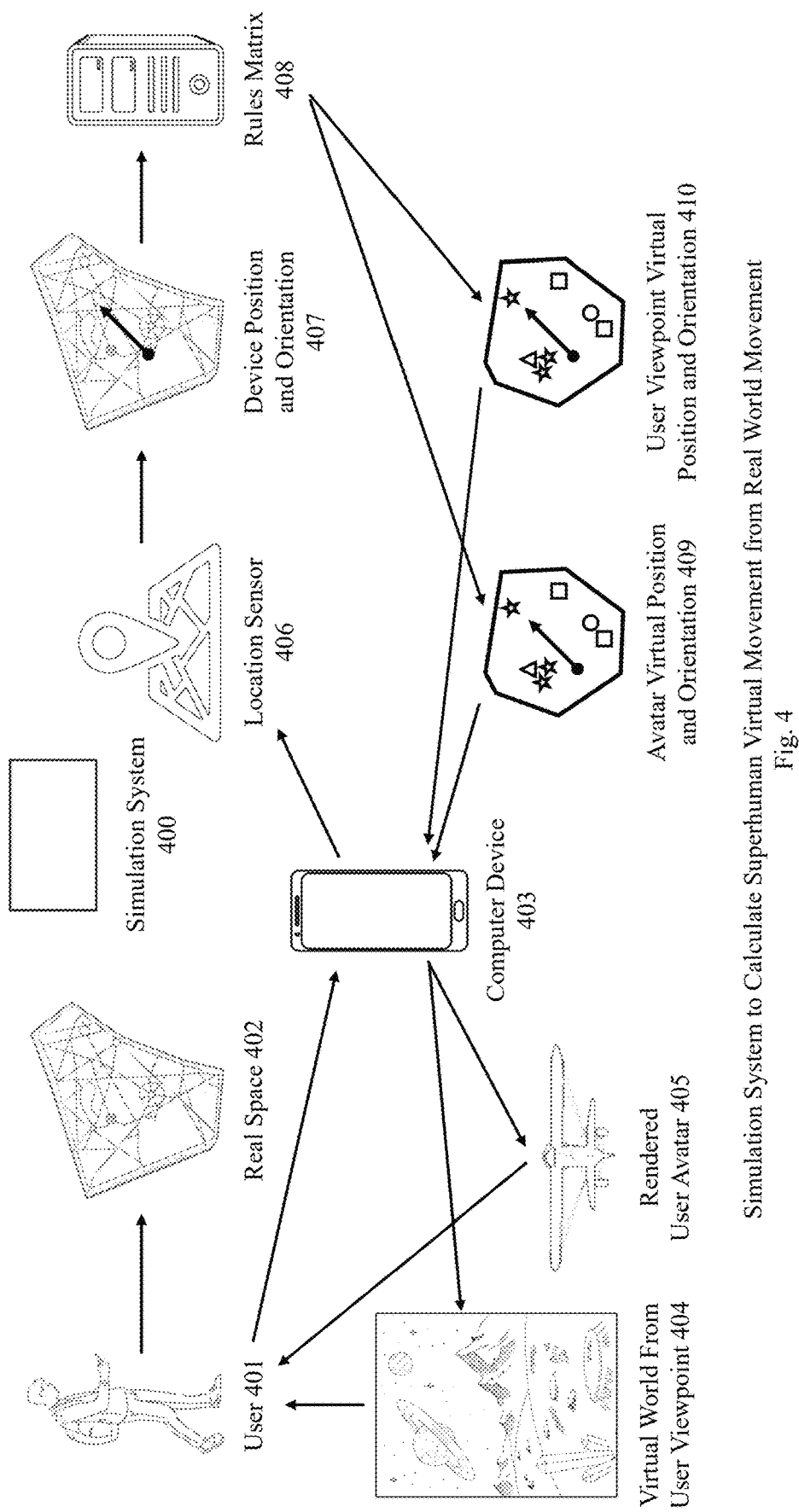
FIG. 4 shows the architecture of the system to control superhuman virtual movement.

FIG. 4 shows the architecture for a simulation system 400 that may be used to implement preferred embodiments.

The Simulation System 400 enables a User 401 to physically walk through a Real World Space 402, holding or wearing a Computer Device 403, and display a Virtual World 404 From a User Viewpoint 404 and display a User Avatar 405 in that Virtual World 404. The Virtual World 404 is mapped (correlated with) the Real World Space 402. The User's 401 movements in the Real World Space 402 control corresponding movements of the User Avatar 405 in the Virtual World 404.

The computer device 403 has one or more Location Sensors 406 that report the Device's Position and Orientation 407, which the simulation system 400 then feeds into a Rule Set 408 to calculate changes to the User Avatar Virtual Position and Orientation 409 and the User Viewpoint Virtual Position and Orientation 410. These changes are then rendered on the computer device 403 for the user to see. Output from the computer device could also include haptic feedback or commands for the user to move in a specified way.

It should be understood that the Simulation System 400 may be implemented entirely by one or more programmable data processors that are resident within the Computer Device 403. However, in other implementations, the Simulation System 400 may be implemented in whole or in part by one or more data processors that are external to the Computer Device 403, such as servers or cloud computers connected wirelessly to communicate with, exchange data with, and control the Computer Device 403.

Permitted Virtual World Movements of the User Viewpoint

Figure 5B:
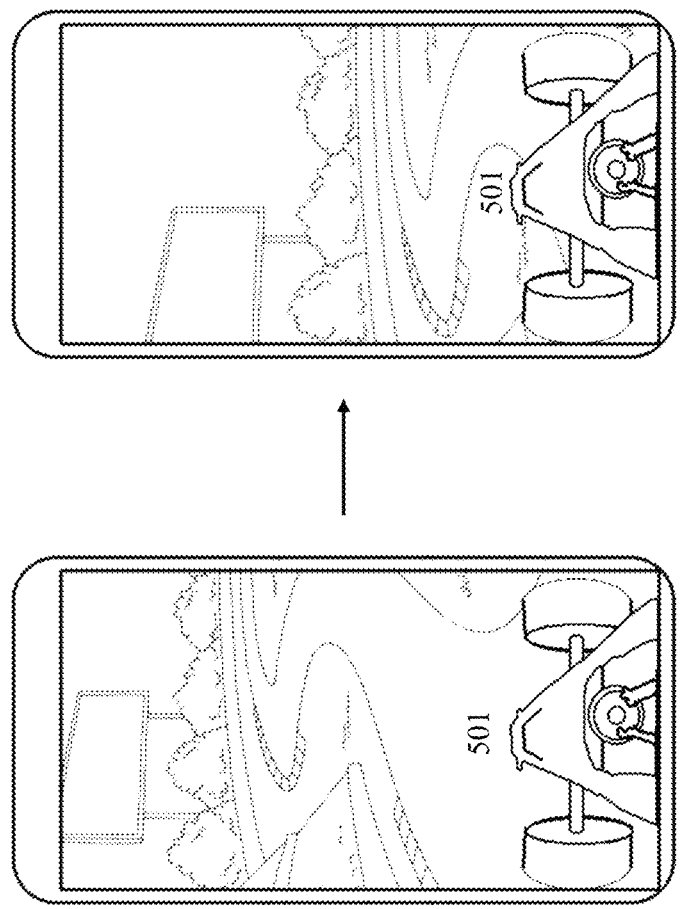
FIGS. 5A to 5B show permitted movements of the user's viewpoint in the virtual world.
Figure 5A:
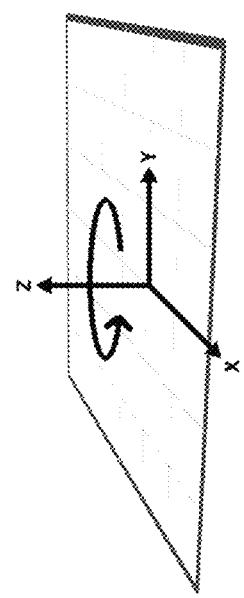

FIGS. 5A to 5B show how the user's viewpoint in the virtual world is permitted to move.

While the user avatar moves in the virtual world, the user's viewpoint may also move. As in FIG. 5A, the user viewpoint is a 3D point in the virtual space and an orientation. To reduce disorientation, the user viewpoint is permitted to translate but not to rotate except along the Z axis. This keeps the ground plane of the real world and the ground plane of the virtual world parallel at all times. Thus the user should not feel off-balance in the real world.

FIG. 5B illustrates a forward movement. Starting from the view of a race track shown on the left side of this figure, a race car avatar 501 and the user viewpoint are moved forward together, so that the avatar 501 appears to stay in the same place on the device as the virtual world comes closer at the viewpoint depicted on the right side of FIG. 5B.

Permitted Virtual World Movements of the User Avatar

FIGS. 6A to 6B show an example of how a user's avatar in the virtual world is permitted to move.

To rotate the avatar around the X-axis, as in FIG. 6A, or Y-axis, as in FIG. 6B, the virtual world cannot also rotate, because if the virtual ground plane is not kept parallel to the real world ground plane, this will cause the user, standing upright, to be disoriented, off-balance. Instead, the avatar 601 is shown on the user's device to rotate while the virtual world remains fixed.

To rotate the avatar around the Z-axis, the avatar is not shown rotated to the user because that would disturb the user's sense of left and right. Instead, the virtual world itself is shown rotated. When the avatar is translating through the virtual world, the avatar is not shown as moving, but instead the virtual world moves.

In other words, movements of the avatar through the virtual world are shown on the device as either an avatar movement or as a virtual world movement (but not both), whichever is better to reduce disorientation of the user, as the user walks in a real world space.

Set of Movement Rules

FIG. 7 shows how a matrix of movement rules can map the user's real world motions to motions of the user avatar in the virtual world, depending on what type of superhuman motion is desired. In this example, the avatar is an airplane. The set:

Maximizes the alignment of the real world movement with the proportional user viewpoint and user avatar motions in the virtual world, and Enforces limitations to the user viewpoint, as in FIGS. 5A to 5B.

May optionally work in reverse, giving real world user feedback such as haptics or movement requests on the basis of changes in the virtual world.

The center column lists example constraints. For example, a positive X-axis translation in the real world results in acceleration or deceleration of the virtual avatar, in an amount proportional to the user's walking speed. A negative translation may brake the avatar's momentum. An X-axis rotation may result in banking the avatar left or right, stopping when its tilt angle matches the user orientation. A Y-axis rotation may accelerate banking of the avatar. A Z-axis rotation may also result in banking the plane avatar and stopping when its virtual world orientation matches the user's orientation.

As indicated in the right hand column, other constraints may be appropriate for a given real world motion. For example, a positive X-axis translation above certain speeds may be ignored and speeds below a minimum may result in stalling the plane avatar. A negative translation may not result in reverse movement of the plane. An X-axis rotation may result in spinning the avatar, but not the ground plane. A Y-axis rotation above a certain amount may be ignored.

These constraints are now described in more detail.

Proportional Positive X-Axis Translation and "Outpacing"

As in FIG. 2B, the user moves forward along the X-Axis simply by walking straight ahead in the real world.

The user's speed in the real world SR is typically used, for example, by simply multiplying a proportion constant, to calculate a set proportional speed for the airplane avatar in the virtual world, Sv. The airplane avatar smoothly accelerates or decelerates until it reaches Sv.

If the user's speed goes above some maximum limit that is either beyond the airplane avatar's maximum proportional speed, or is an unsafe speed for the real world, that maximum limit is used for SR in calculations.

If the user's speed goes below some minimum limit, or the user stops walking, as in FIG. 2A, the plane may stall and rotate down towards the ground. In this case, the virtual world is not shown as tilted on the user device. The airplane avatar is shown as tilted. The virtual world is always shown as level in this instance, to reduce user disorientation.

A normal experience would be for the user to walk forwards in the real world at a moderate speed. As in FIG. 5B, on the device the avatar and user viewpoint move the same, so, as shown on the user device, the avatar does not appear to move at all and the virtual world "comes towards" the user. This is an intuitive movement: the user moves forward while the virtual world moves past.

The system may also need to handle when the user outpaces the user avatar. For example, if the user immediately starts to run at high speed, the plane's measured acceleration will not allow it to immediately jump to its top virtual speed. Or the user may be running so quickly that he or she is simply going faster in the real world than the plane's proportional top speed, as mapped back into the real world. In this case, keeping the avatar and user viewpoint aligned, as in FIG. 5B, would require the virtual world to seem to move backwards (the user viewpoint to move forwards). Seeing the world appear to move back as the user moves forwards physically would be jarring.

Figure 8:
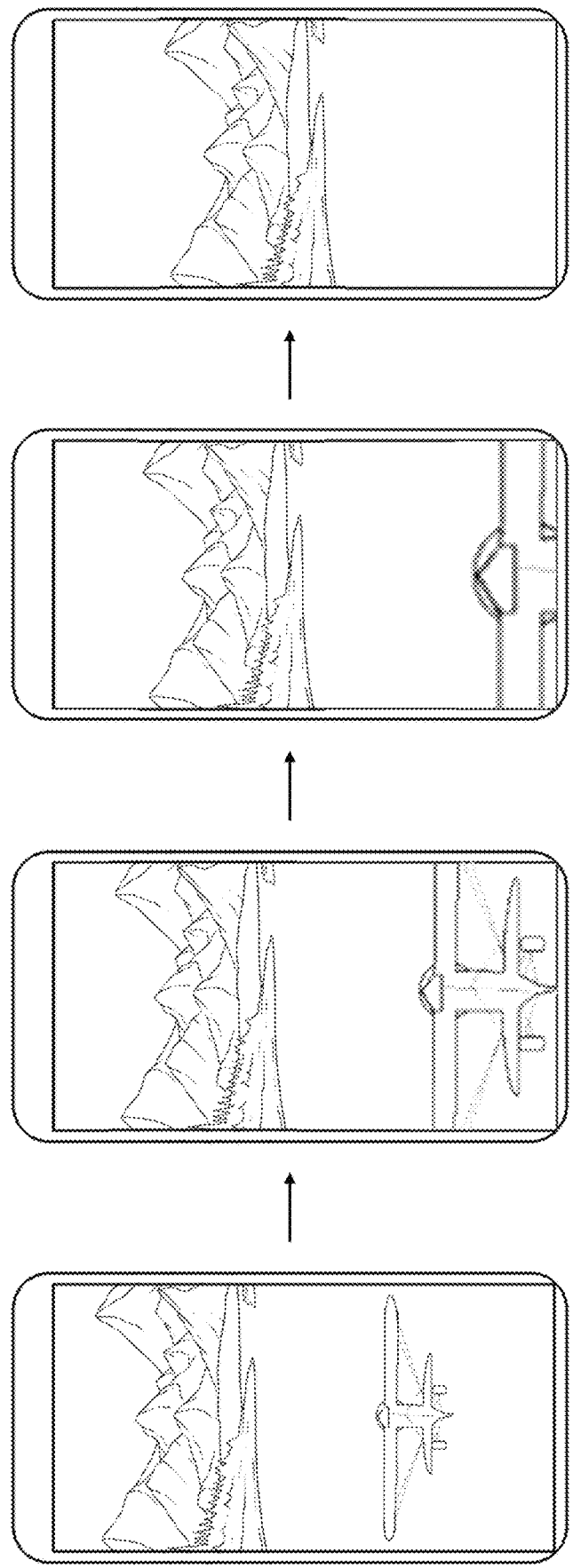
FIG. 8 shows a user moving proportionally too fast for the virtual avatar, "outpacing" it.

So in this case, as in FIG. 8, the system allows the user avatar to "fall behind" the user viewpoint on the device, so that the virtual world can still appear to be "coming towards" the user, or at least keeping pace.

Negative X-Axis Translation

As in FIG. 2C, the user may walk backwards. This has no correlate to airplanes and is an awkward real-world behavior. The simulation system cannot forbid this movement, however, because it has no control over the motions that the user chooses.

So in this case, the result is that the user "outpaces" the avatar in the negative direction. If the system kept the avatar in a static position on the user's device, it would feel to the user as if the aircraft itself were moving backwards. So instead, the system allows the avatar to move out in front of the user. The effect will be similar to that shown in FIG. 8, but with the sequence in time of the views being in the opposite direction that was described in the previous case. That is, the sequence of views of the virtual world would transition from rightmost to leftmost.

Y-Axis Translation

As in FIG. 2C, the user may walk sideways. This also has no correlate to airplanes and is an awkward real-world behavior. The system either banks the airplane left or right into a turn, or allows the avatar to slide off of the user's device screen to the left or right.

Z-Axis Translation

As in FIG. 2C, the user may jump, moving slightly along the Z-Axis in the real world. This also has no correlate to airplanes and the system either banks the plane up, or allows the user to briefly outpace the avatar, moving the avatar higher in the user's device screen. Or perhaps a jump could activate the plane's ejector seat. Crouching down would achieve the opposite effect, either banking the plane down or moving the avatar lower on the user's device screen.

X-Axis Rotation

As in FIG. 2D, the user may rotate the device. The avatar would bank left or right. If the user outpaces the ability of the avatar to bank, then it would be shown smoothly reaching a set point. Otherwise, the avatar itself does not need to change on the user's device screen, because the entire device is being tilted. Meanwhile, to counter that tilt, the virtual world would be tilted opposite, so that the virtual ground plane remains parallel to the real world ground plane, to avoid unbalancing the user.

Y-Axis Rotation

As in FIG. 2E, the user may rotate the device up or down, which creates a "set point". This would smoothly bank the avatar up or down until it achieves this angle, while countertilting the virtual world so that the virtual ground plane remains parallel to the real world ground plane.

In addition, the system should not "reward" the user for awkward movements in the real world like trying to look directly upwards. For example, if the user tries to tilt the mobile device being worn or held to an uncomfortable low or high past some limits, the system should not provide any further input to the airplane.

The airplane avatar may also have fixed limits to how tilted up or down it can go. If the user outpaces the airplane's maximum turn speed or maximum angle or orientation, the avatar is allowed to slip off of the user's device screen until it catches up, if ever.

Z-Axis Rotation

As in FIG. 2F, the user may turn left or right.

Similar to the above section, this motion will bank the plane left or right until it reaches the user's orientation as a set point. If the user outpaces the avatar's maximum turning speed, the avatar then rotates away or slides off of the user's device screen to the left or right until it catches up.

How to Display the Avatar's Landscape Backdrop at High Speeds

Figure 9B:
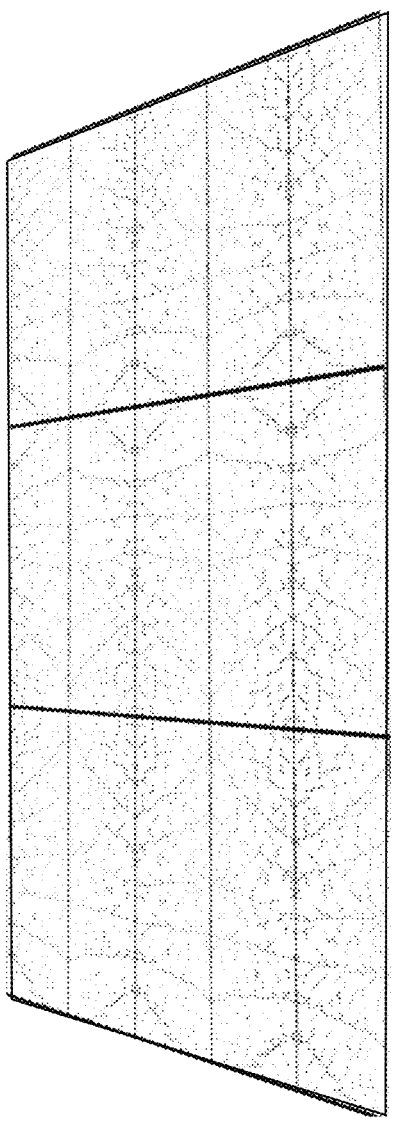
FIGS. 9A and 9B show how to display the avatar's landscape backdrop at high speeds.
Figure 9A:
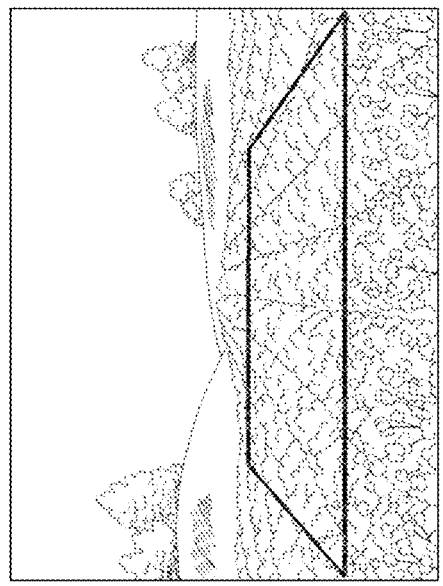

FIGS. 9A and 9B show what to display behind the virtual avatar as a backdrop.

Augmented reality experiences often show a real world environment, as seen by the mobile device camera, behind the virtual objects such as the user avatar. This makes the user feel "immersed", as if objects in the virtual world really exist in the real world.

In the system and methods described herein, however, the user avatar in the virtual world moves too quickly to be matched to a real world environment as it passes by the slowly walking real-world user.

The augmented reality simulation system may respond to this challenge by:
- providing an entirely virtual landscape behind the user avatar,
- showing the real world landscape, but adding hints of virtual landscape such as trees to give a sense of faster movement, or
- taking a visual sample of the real world from the device's camera from below the horizon line, as in FIG. 9A, and then making copies of this sample, perhaps mirrored, to tile a "virtual landscape", as in FIG. 9B, which is large enough to whoosh past the user at high relative speed.

Example Method of Operating the Virtual Experience Simulation System

Figure 10:
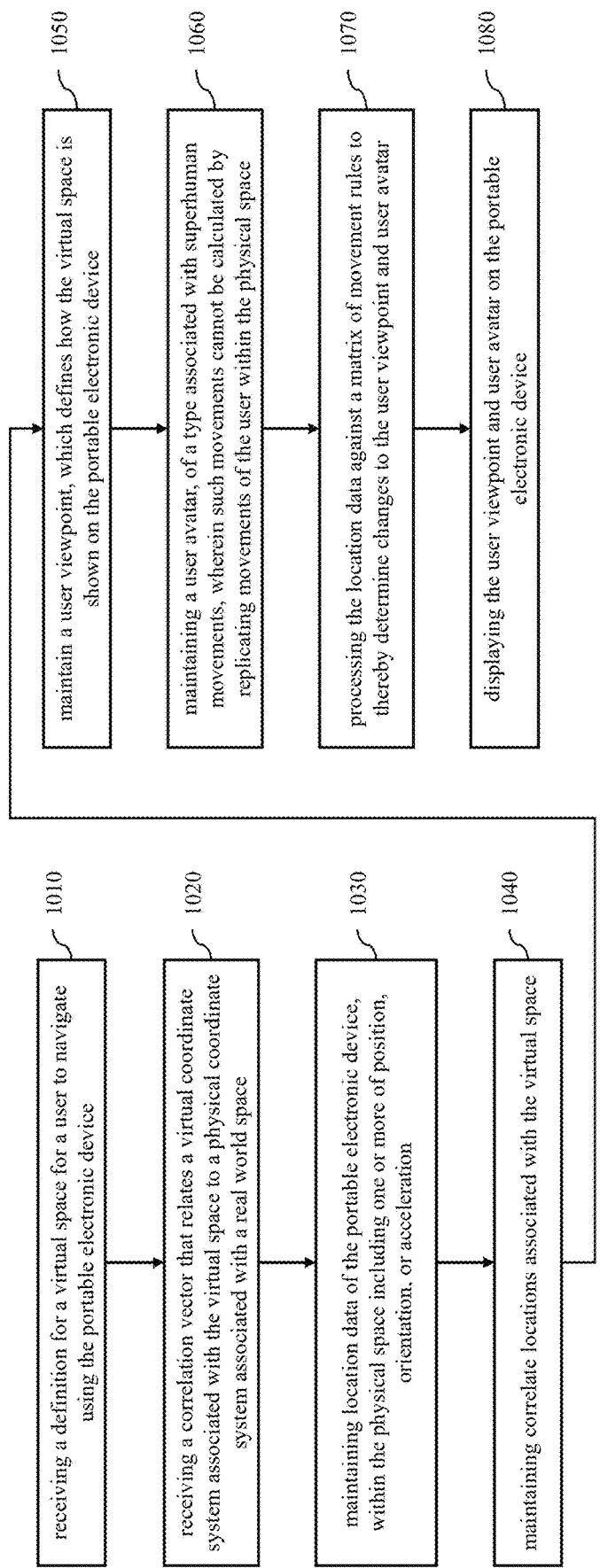
FIG. 10 is a flowchart of an example method of operating a portable electronic device to provide a virtual experience simulation system.

FIG. 10 is a flowchart of an example method of operating a portable electronic device to provide a virtual experience simulation system.

At step 1010, the method is receiving a definition for a virtual space for a user to navigate using the portable electronic device.

At step 1020, the method is receiving a correlation vector that relates a virtual coordinate system associated with the virtual space to a physical coordinate system associated with a real world space.

At step 1030, the method is maintaining location data of the portable electronic device, within the physical space, the location data responsive to the estimates of physical location of the portable electronic device, the location data including one or more of position, orientation, or acceleration.

At step 1040, the method is maintaining two correlated locations associated with the virtual space including. The correlated locations include:
- At 1050, a user viewpoint, which defines how the virtual space is shown on the portable electronic device.
- At 1060, a user avatar, of a type associated with superhuman movements, wherein such movements cannot be calculated by replicating movements of the user within the physical space.

At step 1070, the method continues operating the virtual experience system, for further processing the location data against a set of movement rules to thereby determine changes to the user viewpoint and user avatar.

At step 1080, the method is displaying the user viewpoint and user avatar on the portable electronic device.

Avatars with Prohibited User Motions

As shown in FIG. 8, there are some types of virtual avatar that cannot handle some types of real-world user motion. In FIG. 8, the user runs so quickly that the input motion becomes invalid. Whether it's for safety's sake in the physical world, or simply the airplane avatar has reached its maximum speed, the system responds to the user running by allowing the user avatar to "fall behind" the user viewpoint on the device.

To generalize, some user motions may be prohibited for some avatars, and the system will need to react. User motions may include:

the user walks or runs forward faster than permitted,
the user holds the phone at arm's length and moves it rapidly left and right, in an attempt to make the avatar dodge faster than a person's body can move,
the user walks backwards, which is disallowed,
the user drops or throws the phone to dodge an attack, faster or higher than a person's body can move, and
the user otherwise shakes the phone in a way that is abnormal for a user's body to move.

While obviously the system cannot physically prevent the user from such prohibited movements, the simulation can do more than simply shut down as in prior art. Instead, the simulation can leverage some algorithm to:

adapt the simulation to intuitively warn the user and communicate how to return to a permitted user motion,
respond minimally to minimal user motion violations,
keep the user avatar within its motion limits, and
minimize dissonance between the real and virtual worlds and how they are shown to the user.

Through such algorithms, the system:
1. detects the user's physical motion, as in FIGS. 2A to 2F.
2. uses a set of movement rules to choose a response, as in FIGS. 7, and
3. responds by changing any or all of these simulation factors:
   a. the avatar's position and orientation in the virtual world 409,
   b. the user's viewpoint within the virtual world 410, which determines how the virtual world is rendered to the user 404, and
   c. the placement of the virtual space into the real space, as in FIG. 1C.

For example, in the example in FIG. 8:
because the avatar has reached its maximum speed limit, the avatar's virtual position is separated from correlate virtual world position of the physical user, and allowed to fall behind the correlate virtual world position of the physical user,
the user's viewpoint within the virtual world follows the correlate virtual world position of the physical user, and
the placement of the virtual space into the real space does not change.

Figure 11:
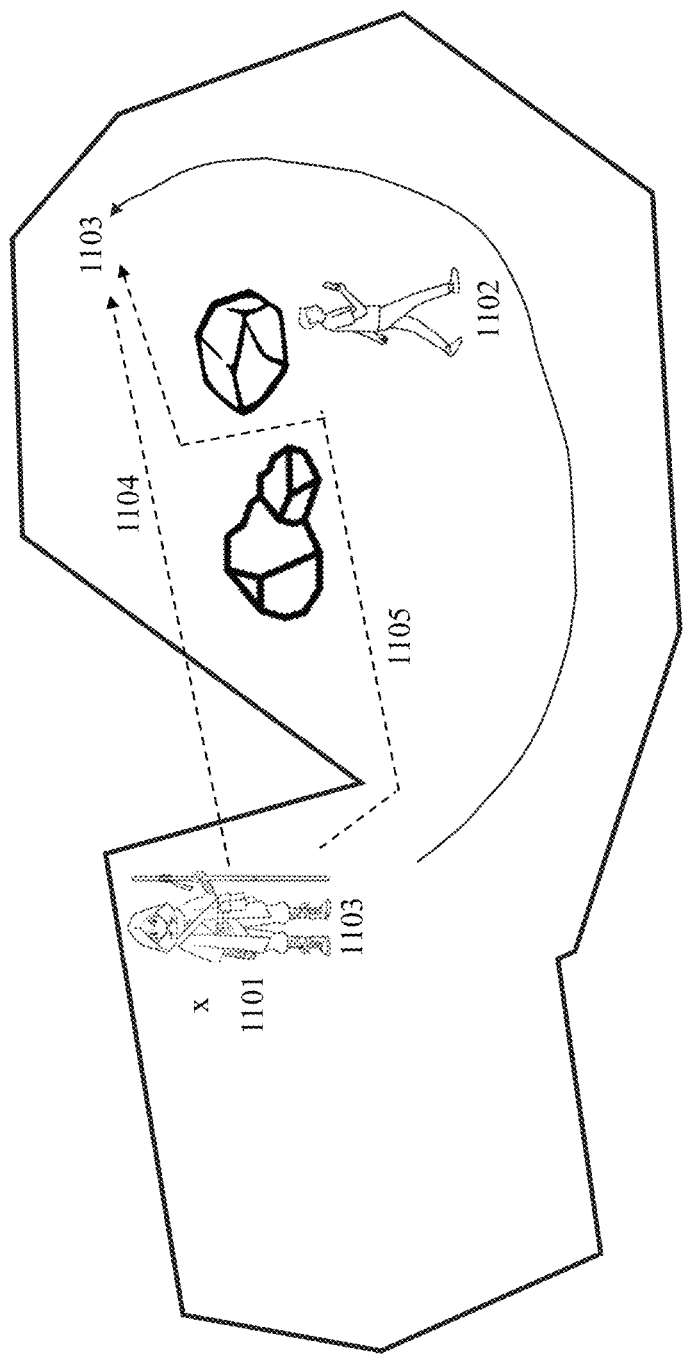
FIG. 11 shows responding to prohibited user motion by adapting the avatar location and orientation.

FIG. 11 shows responding to prohibited user motion by adapting the avatar location and orientation. The steps are:
1. The user and avatar both begin at point 1101. In this example, the placement of the virtual space into the real space never changes, so the user in at a real world point correlated to 1101 and the avatar is at a virtual world point correlated to 1101.
2. The user runs ahead along a path 1102, towards 1103.
3. For this avatar, running is a forbidden user motion, either for the user's safety or simply because the avatar has a maximum speed. As the user runs, the avatar takes the user's current position correlated into the virtual world as a goal destination.
4. The avatar then begins to move at its maximum speed towards the goal destination.
5. The avatar cannot take a direct path 1104 because that (a) leaves the set boundary on the simulated experience, if there is any such boundary, and also (b) takes the avatar through rocks in the virtual world, which are impenetrable.
6. So instead, the avatar takes path 1105, remaining within the simulated experience boundary, if one exists, and navigating around obstacles. As long as the user eventually stops the prohibited motion, the avatar will eventually catch up.

Figure 12:
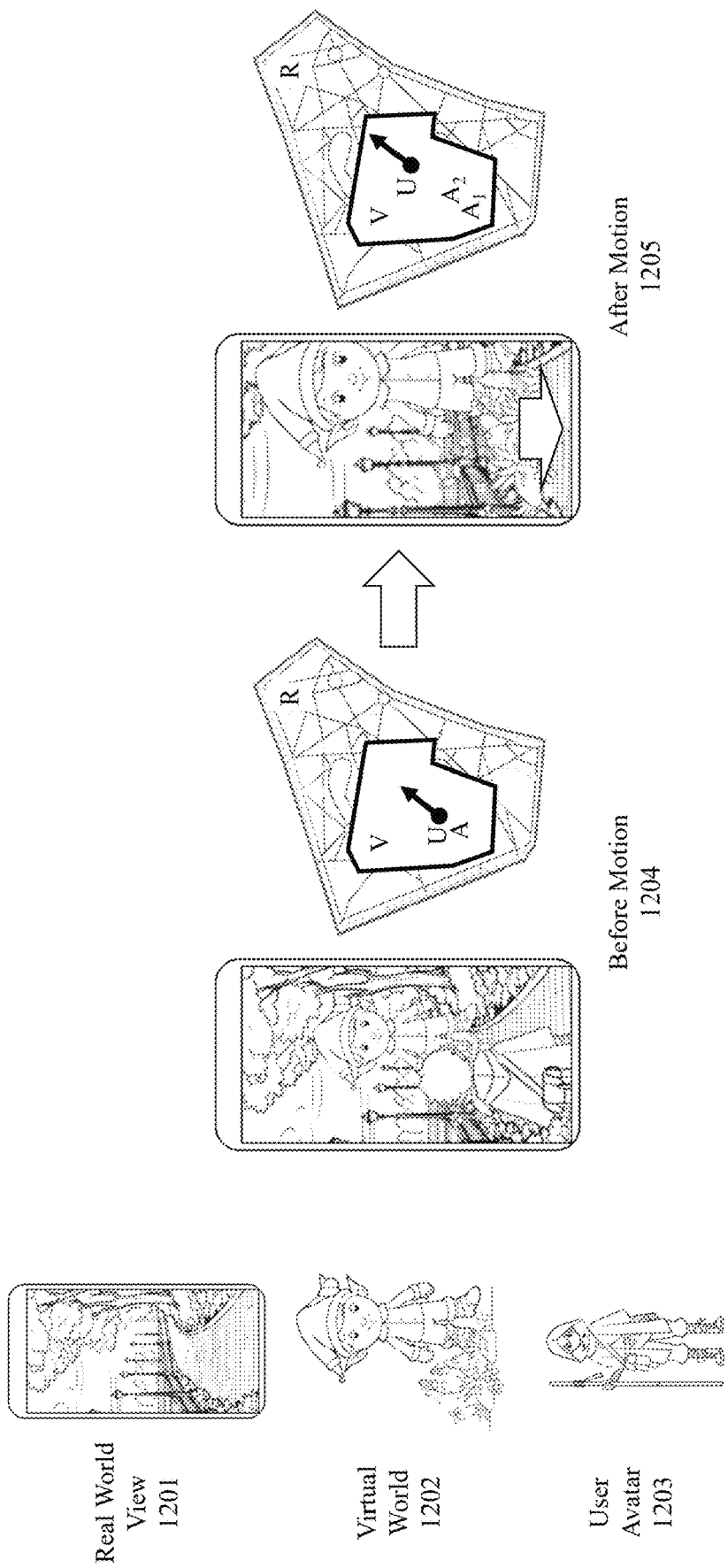
FIG. 12 shows an example of the system responding to prohibited user motion that does not move the virtual world.

FIG. 12 shows an example of the system responding to prohibited user motion that does not move the virtual world.

These things are composited together to form the view on the user's Computer Device 403:

the real world view 1201 as seen from the Computer Device camera,
a virtual world 1202, in this case a garden world spanning dozens of square meters, with an elf and some flowers nearby,
a user avatar 1203, which is added into the virtual world.

In 1204, before the user begins running, a prohibited motion for this type of avatar, the real world, virtual world, and avatar are shown on the user's computer device. The avatar's virtual position and orientation A in the virtual world V is in the same place as the user's physical position and orientation U in the real world R, as correlated by the position of the virtual world V in the real world R.

In 1205, while the user runs, the placement V of the virtual world into the real world has not changed, and therefore the user position U advances in both the real world and the virtual world. As shown on the user's device, both the real world camera view and the virtual world follow the user's location U, with the elf and flowers shown much closer.

However, the avatar cannot move at a speed matching the user. At its maximum speed, the avatar moves only from $A_1$ to $A_2$.

So the avatar is no longer shown on the computer device because it has fallen behind the user. This signals to the user that something is wrong, without halting the simulation. Some other indication may be added to the simulation, such as the arrow shown pointing to where the avatar is. The user understands that the avatar will need time to catch up to the user's current location, before the user can interact through the avatar with the elf. The user may then stop the prohibited running behavior, now and in the future, because it brought no benefit. In some instances, the avatar may fail to catch up to the user's position for any number of reasons: getting tired walking, facing an avalanche of rocks, or other reason. If the avatar fails to arrive, the user will need to return to the avatar's location instead of waiting and some failure state indicated.

Although not shown in the figure other indications are possible such as reporting the failure state, or showing the time needed to catch up, etc.

Figure 13:
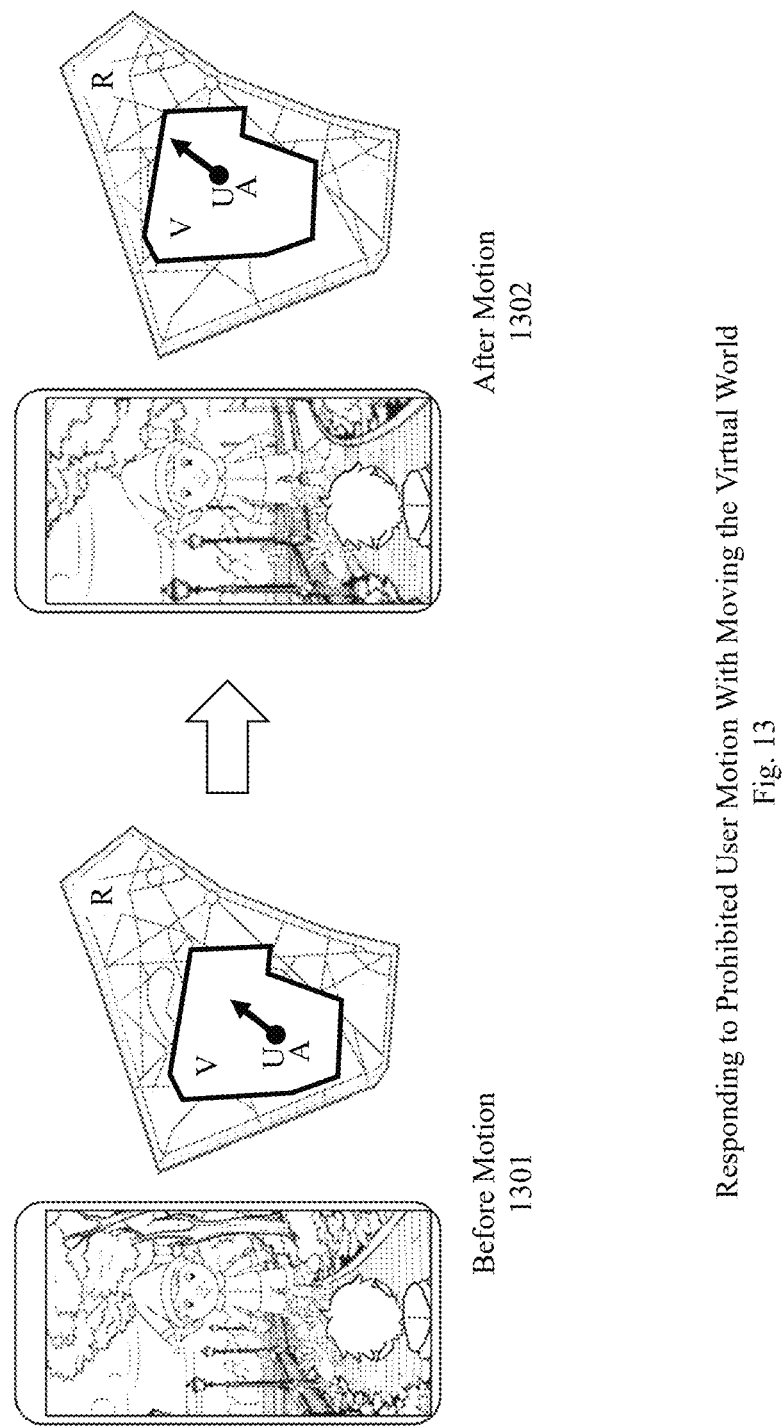
FIG. 13 shows an example of the system responding to prohibited user motion that does move the virtual world.

FIG. 13 shows an example of the system responding to prohibited user motion that does move the virtual world.

In 1304, before the user begins running, again the avatar, the real world, virtual world, and avatar are shown on the user's computer device. The avatar's virtual position and orientation A in the virtual world V is in the same place as the user's physical position and orientation U in the real world R, as correlated by the position of the virtual world V in the real world R.

In 1305, while the user runs, the real world view follows the user position U in the real world, because of course it does, coming from the user's real-time camera view. But the view of the virtual world no longer tracks the position and orientation of the user U. Instead it follows the position and orientation of the avatar A, which has fallen behind the user in the virtual world, but the placement of the virtual space has changed, so that the avatar is at the same physical coordinate as the user (in other words, the view of the virtual world should aways be as if from the eyes of the avatar, no matter how far the user has travelled in the physical world). To accomplish this, the virtual world's placement into the real world is moved to counter the excess motion. For example, if the user runs forward X meters and the avatar can only walk ahead Y meters forward, the virtual world would move X-Y meters forward. It would feel to the user like, no matter how fast he ran, his progress through the virtual world was limited, like walking on a treadmill.

Variations to this approach could include:
- showing the virtual world from some other perspective, such as midway between the avatar and user, or
- the avatar not being shown at all in the computer device, with the user understanding his place in the virtual world solely from the view of the virtual world.

FIG. 14 shows an example with a different movement that is not forward motion. In this case. In 1401, the user confronts an enemy with a gun. In 1402, the user dodges the gun severely by moving rapidly to the right. The simulation system deems that this rapid motion is either unsafe in the real world or simply prohibited for this type of avatar, who may be an old man with a walking cane who cannot dodge very well.

So 1402 is not shown to the user. Instead, in 1403, the avatar's dodging motion is shown very limited, and the enemy with a gun moves only slightly. The user will get the hint that severe side motions bring no benefit.

Other Implementation Options

The foregoing description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the data processing systems, or wireless communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

In some instances, the various "data processors" may each be implemented by a physical or virtual general purpose computer having a central processor, memory, disk or other mass storage, communication interface(s), input/output (I/O) device(s), and other peripherals. The general-purpose computer is transformed into the processors and executes the processes described above, for example, by loading software instructions into the processor, and then causing execution of the instructions to carry out the functions described. As is known in the art, such a computer may contain one or more central processing units, disks, various memories, and input/output ports that enable the transfer of information between the elements. The central processor units provide for the execution of computer instructions. One or more memories provide volatile and/or non-volatile storage for these computer software instructions and data used to implement an embodiment. Disks or other mass storage provides non-volatile storage for these computer software instructions and data used to implement, for example, the various procedures described herein. The instructions may therefore typically be implemented in hardware, custom designed semiconductor logic, Application Specific Integrated Circuits (ASICs), Field Programmable Gate Arrays (FPGAs), firmware, software, or any combination thereof. In certain embodiments, the procedures, devices, and processes described herein are a computer program product, including a computer readable medium (e.g., a removable storage medium such as one or more DVD-ROM's, CD-ROM's, diskettes, tapes, etc.) that provides at least a portion of the software instructions for the system.

It also should be understood that the block and system diagrams may include more or fewer elements, be arranged differently, or be represented differently. But it further should be understood that certain implementations may dictate the block and network diagrams and the number of block and network diagrams illustrating the execution of the embodiments be implemented in a particular way.

It is understood by those skilled in the art that various changes in form and details may be made therein without departing from the legal scope of this patent as encompassed by the appended claims.

The invention claimed is:

1. A method of interaction between a portable electronic device and a virtual experience simulation system, the method performed by at least one processor within the portable electronic device, and the method comprising:
   a) receiving a definition of a virtual space for a human user to navigate using the portable electronic device;
   b) receiving a correlation vector that relates a virtual coordinate system associated with the virtual space to a physical coordinate system associated with a physical space in a real world, wherein the correlation vector does not depend on the human user identifying any particular object;
   c) maintaining location data of the portable electronic device, within the physical space, using data provided from at least one of a camera or location sensor associated with the portable electronic device, the location data responsive to estimates of physical location of the portable electronic device, the location data including at least a position of the electronic device within the physical space;
   d) maintaining two correlate locations associated with the virtual space including:
      i) a user viewpoint, which defines how the virtual space is shown on the portable electronic device, and which is calculated to match the virtual world correlate of a physical position and orientation of the human user; and
      ii) a user avatar, which replicates movements of the human user as detected from the estimates of the physical location of the portable electronic device within the physical space;
   e) operating the virtual experience system, for further processing the location data against one or more movement rules to thereby determine changes to the user viewpoint of the virtual world, the user avatar, and correlation between the virtual world and real world, such that the one or more movement rules define invalid user motions in the real world, such that when the one or more movement rules applies, the location of the user avatar is separated from the user viewpoint; and f) causing a display, by the portable electronic device, of a view of the virtual world overlaid on a view of the real world.

2. The method of claim 1 wherein the one or more movement rules comprise:
controlling the user avatar to follow a path of the human user in the real world, regardless of where the human user ends up;
controlling the user avatar to head towards a current position of the human user, even as the current position keeps changing if the human user moves; or
controlling the user avatar to execute a movement that does not correspond to the human user movement.

3. The method of claim 1 additionally comprising: providing an indication as to a position of the user avatar and/or estimated time for the user avatar to arrive at the user viewpoint.

4. The method of claim 1 wherein the one or more movement rules further comprise: controlling the user avatar to make a best effort to arrive at a current position of the human user in the virtual world as correlated from the physical world.

5. The method of claim 1 wherein if the user avatar fails or is expected to fail to arrive at the user viewpoint, an indication is provided that the human user will need to take action to meet up with the user avatar before proceeding further.

6. The method of claim 1 wherein the correlation of the virtual space into the real space is calculated such that the user viewpoint of the virtual world is calculated to match a position and orientation of the user avatar.

7. The method of claim 6 additionally comprising: providing an indication as to the position of the user avatar and/or estimated time for the user avatar to arrive at the user viewpoint.

8. The method of claim 6 wherein the one or more movement rules further comprise: controlling the user avatar to make a best effort to arrive at the current position of the human user in the virtual world as correlated from the physical world.

9. The method of claim 6 wherein if the user avatar fails or is expected to fail to arrive at the user viewpoint, an indication is provided that the human user will need to take action to meet up with the user avatar before proceeding further.

10. The method of claim 6 wherein the user avatar is not shown on the display.

11. The method of claim 1 wherein the correlation of the virtual space into the real space is calculated such that the user viewpoint of the virtual world is a bird's eye view from above.

* * * * *